United States Patent
Min et al.

(10) Patent No.: US 10,474,951 B2
(45) Date of Patent: Nov. 12, 2019

(54) MEMORY EFFICIENT SCALABLE DEEP LEARNING WITH MODEL PARALLELIZATION

(71) Applicant: NEC Laboratories America, Inc., Princeton, NJ (US)

(72) Inventors: Renqiang Min, Princeton, NJ (US); Huahua Wang, Minneapolis, MN (US); Asim Kadav, Jersey City, NJ (US)

(73) Assignee: NEC Corporation (JP)

( * ) Notice: Subject to any disclaimer, the term of this patent is extended or adjusted under 35 U.S.C. 154(b) by 534 days.

(21) Appl. No.: 15/271,589

(22) Filed: Sep. 21, 2016

(65) Prior Publication Data

US 2017/0116520 A1     Apr. 27, 2017

Related U.S. Application Data

(60) Provisional application No. 62/310,864, filed on Mar. 21, 2016, provisional application No. 62/245,481, filed on Oct. 23, 2015.

(51) Int. Cl.
  *G06N 3/08*   (2006.01)
  *G06F 17/16*  (2006.01)
  *G06N 3/04*   (2006.01)

(52) U.S. Cl.
  CPC ............ *G06N 3/08* (2013.01); *G06N 3/0454* (2013.01); *Y04S 10/54* (2013.01)

(58) Field of Classification Search
  CPC ....... G06N 3/084; G06N 3/0635; Y04S 10/54
  USPC .......................................................... 706/25
  See application file for complete search history.

(56) References Cited

U.S. PATENT DOCUMENTS

| | | | | |
|---|---|---|---|---|
| 5,687,286 A * | 11/1997 | Bar-Yam | .................. | G06K 9/62 704/232 |
| 7,814,038 B1 * | 10/2010 | Repici | ...................... | G06N 3/08 706/25 |
| 9,009,089 B1 * | 4/2015 | El Defrawy | ...... | G06F 16/90344 706/18 |
| 2001/0049585 A1 * | 12/2001 | Gippert | .................... | C07K 1/00 702/19 |
| 2002/0174079 A1 * | 11/2002 | Mathias | ................. | G06N 3/086 706/15 |
| 2004/0024324 A1 * | 2/2004 | Bratteli | .................. | A61B 5/022 600/490 |
| 2008/0222065 A1 * | 9/2008 | Kedrowski | .............. | G06N 3/08 706/19 |

(Continued)

OTHER PUBLICATIONS

Jeffrey Dean et al., Large Scale Distributed Deep Networks, NIPS 2012: Neural Information Processing Systems, Dec. 2012.

(Continued)

*Primary Examiner* — Kuen S Lu
(74) *Attorney, Agent, or Firm* — Joseph Kolodka

(57) ABSTRACT

Methods and systems for training a neural network include sampling multiple local sub-networks from a global neural network. The local sub-networks include a subset of neurons from each layer of the global neural network. The plurality of local sub-networks are trained at respective local processing devices to produce trained local parameters. The trained local parameters from each local sub-network are averaged to produce trained global parameters.

13 Claims, 6 Drawing Sheets

(56) References Cited

U.S. PATENT DOCUMENTS

2015/0324690 A1* 11/2015 Chilimbi ............... G06N 3/08
  706/25
2017/0199757 A1* 7/2017 Fountain ............... G06F 9/455

OTHER PUBLICATIONS

Trishul Chilimbi et al., Project Adam: Building an Efficient and Scalable Deep Learning Training System, 11th USENIX Symposium on Operating Systems Design and Implementation., Oct. 6-8, 2014.

* cited by examiner

MEMORY EFFICIENT SCALABLE DEEP LEARNING WITH MODEL PARALLELIZATION

RELATED APPLICATION INFORMATION

This application claims priority to U.S. Provisional Application Ser. No. 62/245,481 filed on Oct. 23, 2015, and to U.S. Provisional Application Ser. No. 62/310,864 filed on Mar. 31, 2016, incorporated herein by reference in its entirety.

BACKGROUND

Technical Field

The present invention relates to machine learning and, more particularly, to scalable deep learning in distributed neural networks.

Description of the Related Art

Deep learning models have been successfully applied to learning image, text, video, and audio representations and have achieved significant advances in recognition performance for these tasks. The performance of deep learning models can be further increased by enlarging their scale and learning capacities. Although deep learning models of moderate size work well on speech data sets of proportionally moderate size, they are inadequate to match the perception and reasoning capacity of humans in analyzing structured big data, for example in analyzing a large number of high-resolution images for fine-grained object recognition and scene understanding.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN. Other varieties include convolutions neural networks which include various combination of convolutional and fully connected layers, with the possibility of pooling layers that combine the outputs of neuron clusters.

SUMMARY

A method for training a neural network includes sampling multiple local sub-networks from a global neural network. The local sub-networks include a subset of neurons from each layer of the global neural network. The plurality of local sub-networks are trained at respective local processing devices to produce trained local parameters. The trained local parameters from each local sub-network are averaged to produce trained global parameters.

A system for training a neural network includes multiple local sub-network processing devices. Each local sub-network processing device includes a neural network module having neurons that represent a subset of neurons from each layer of a global neural network. The neural network module is configured to train a local sub-network to produce trained local parameters. A global parameter server is configured to average the trained local parameters from each local sub-network to produce global parameters.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles provide a distributed system for scalable deep learning that achieves both model parallelism and data parallelism. The present embodiments are capable of training large models, even though individual worker devices may not have sufficient memory to hold the entire model. The present embodiments are flexible and can be applied to any variety of machine learning, but deep learning is used as a specific example herein.

The present embodiments focus on two different scenarios: fixed sampling and dynamic sampling. In fixed sampling embodiments, a fixed set of sub-networks is sampled from the whole neural network. In dynamic sampling embodiments, the sub-networks are dynamically sampled from the whole neural network during the training process. For both fixed and dynamic sampling, alternating direction method of multipliers (ADMM) is used to ensure that all of the sampled local models converge to corresponding parts of a global model. The global model may be stored in one or more devices that serve as global parameter servers.

The present embodiments can be implemented over a cluster of devices having, e.g., central processing units (CPUs) and graphics processing units (GPUs). The present embodiments are not limited to such circumstances however—for example, clusters of devices having only CPUs may be used instead.

The present embodiments may be used to train neural network models for, e.g., large-scale image and video classification on commodity clusters of computers (e.g., without GPUs). On computer clusters that do use GPUs, the present embodiments can be used to train even larger models. The present embodiments may furthermore be leveraged to improve training performance for any type of machine learning, with the parallelism introduced herein providing the ability to train classifiers at any scale.

Figure 1:
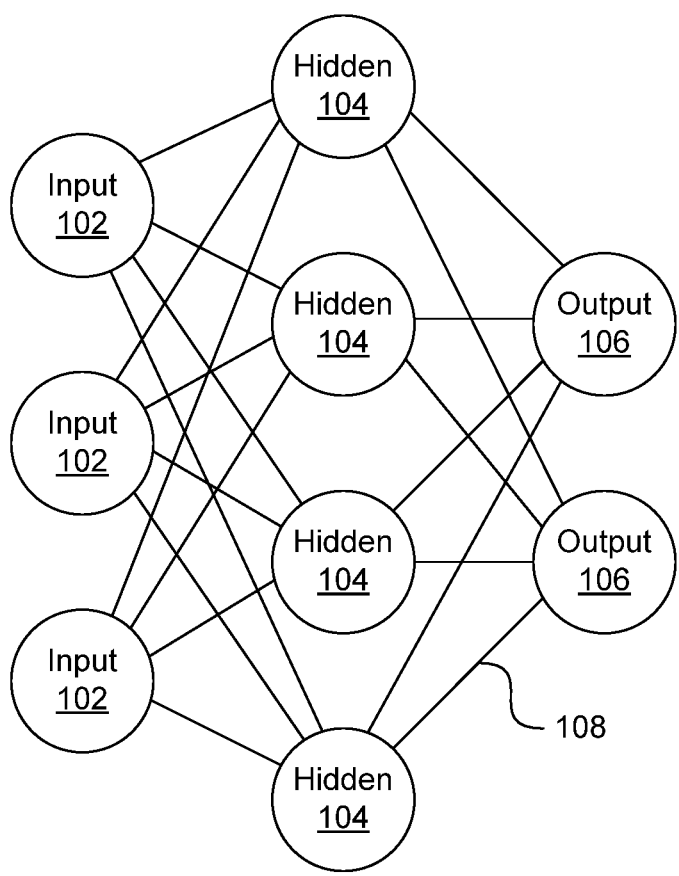
FIG. 1 is a diagram of a conventional neural network.
Figure 2:
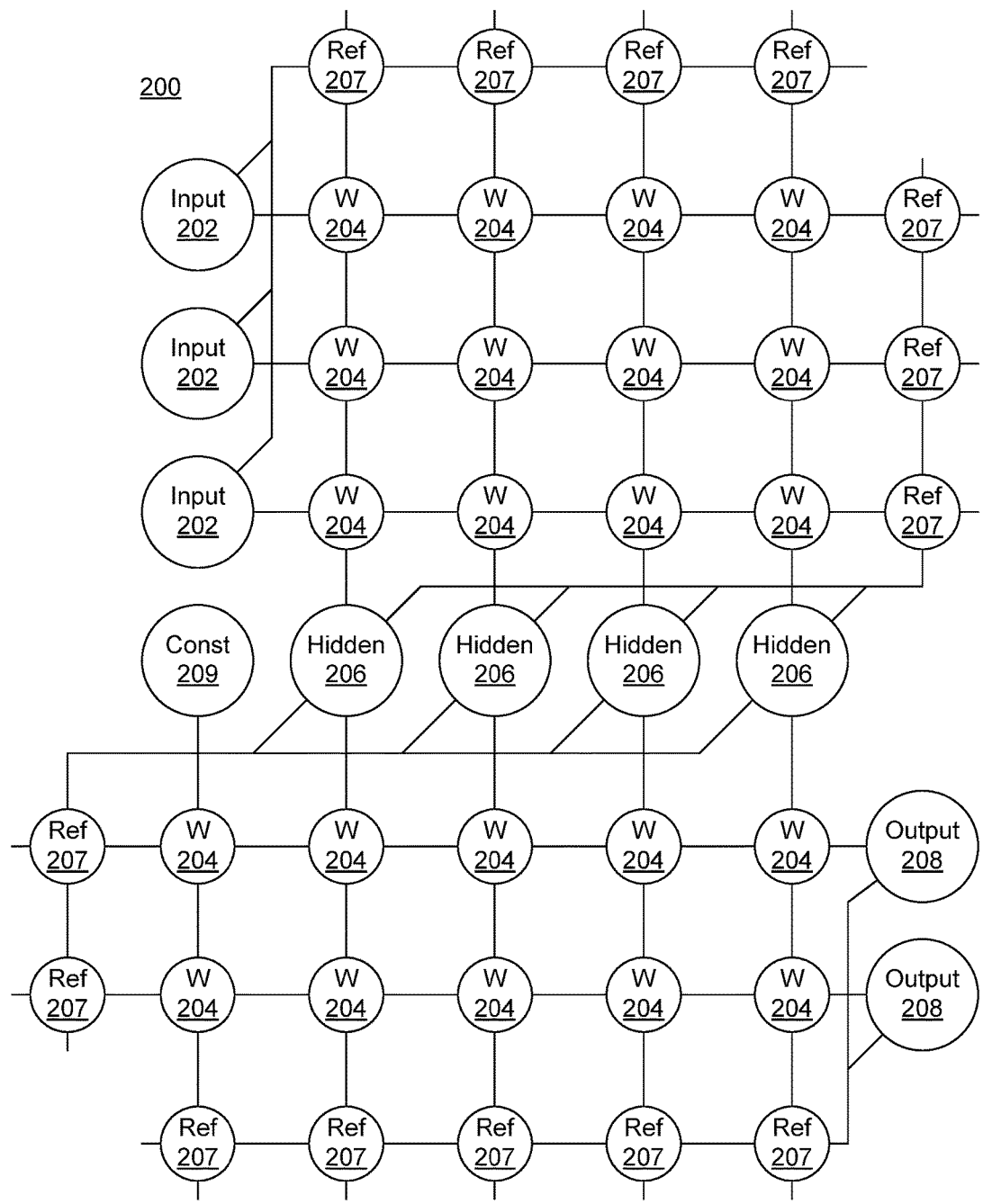
FIG. 2 is a diagram of a neural network system in accordance with the present embodiments.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input in parallel to a respective row of weights 204. The weights 204 each have a settable weight value, such that an output flows from the weight 204 to a respective hidden neuron 206 to represent the weighted input. The output by a given weight is determined as a function of the input value and the weight value. The output from each weight adds column-wise and flows to a hidden neuron 206. A set of reference weights 207 have a fixed values and combine their outputs into a reference output that is provided to each of the hidden neurons 206. For hardware implementations based on, e.g., electrical currents, conductance values can only be positive numbers, in which case some reference conductance is needed to encode both positive and negative values in the matrix. The outputs produced by the weights 204 may be continuously valued and positive, and therefore the reference weights 207 may be used to provide a reference output, above which outputs are considered to have positive values and below which outputs are considered to have negative values.

The hidden neurons 206 use the outputs from the array of weights 204 and the reference weights 207 to perform some calculation. The hidden neurons 206 then produce an output of their own to another array of weights 207. This array performs in the same way, with a column of weights 204 receiving an input from their respective hidden neuron 206 to produce a weighted output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error may be applied to the array as a pulse, where the height and/or duration of the pulse is modulated proportional to the error value. In this example, a row of weights 204 receives a signal from a respective output neuron 208 in parallel and converts that signal into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update backward through the network 200. The combinations of these update signals create a state change within each weight 204, causing the weight 204 to take on a new weight value. In this manner the weights 204 can be trained to adapt the neural network 200 to errors in its processing. It should be noted that the three modes of operation, feed forward, back propagation, and weight update, do not overlap with one another.

In the case of convolutional neural networks (CNNs), the weight arrays may have more dimensions, with learnable filters (or "kernel") which extend through the depth of an input volume. The kernel is convolved across the width and height of the input volume. Neurons in a CNN may be locally connected (e.g., where at least some neurons do not connect to all neurons from the previous volume) or fully connected (e.g., where each neuron connects to all neurons from the previous volume). CNNs may also include pooling layers, which combine the outputs of multiple neurons.

Figure 3:
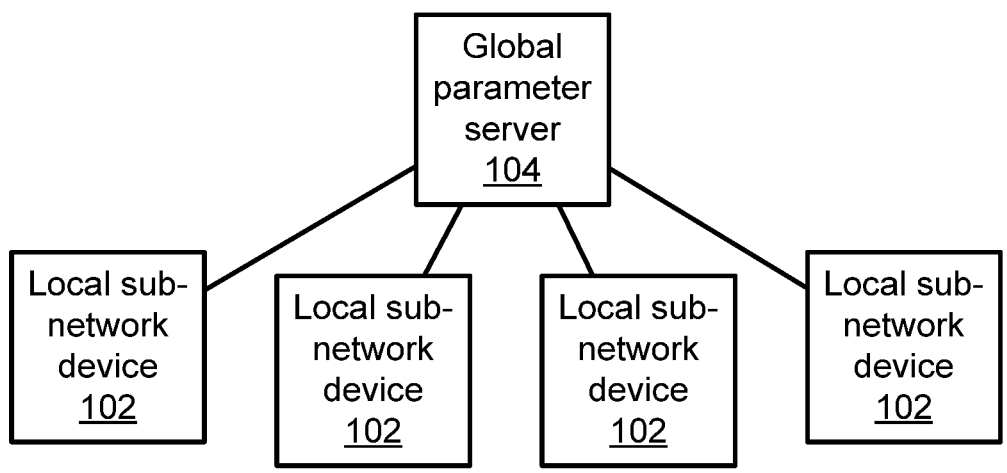
FIG. 3 is a diagram of a distributed neural network system in accordance with the present embodiments.

Referring now to FIG. 3, a diagram of a distributed processing system is shown. The system includes multiple local-sub-network processing devices and one or more global parameter servers 104. The local sub-network processing devices 102 each perform processing on a portion of the global neural network, with the global parameter server 104 managing the parameters of the global network and the local sub-networks. Information is shared between local sub-networking processing devices, for example if they share overlapping model parameters. The local sub-networking processing devices 102 may implement the neural sub-networks in software or using dedicated processing hardware.

The global neural network can be sub-divided into sub-networks. A sub-network includes some subset of the total number of neurons. For example, a given sub-network might have a randomly sampled percentage p (for e.g., p=25) of the neurons of each layer, with the weights 204 being shared between all of the sub-networks. The sub-networks can then be assigned to different local sub-network processing devices 102 to achieve model parallelism. In addition, the dataset being processed can be divided into subsets, with data subsets being assigned to different devices to achieve data parallelism. Therefore, each individual worker device k will have its own local model implemented as an ANN, with model updates being performed locally and independent of the state of the sub-networks being handled by other devices. The present embodiments then use asynchronous randomized parallel direction method of multipliers to perform primal updates and dual updates to ensure that the local model parameters $W^k$ converge to the corresponding parts of the global model $W^{G_k}$. This is equivalent to optimizing the following objective function F globally:

$$\min \frac{1}{k} \sum_k F(W^k) \quad s.t. W^k = W^{G_k}$$

For fixed sampling, the update of the global parameters $W^G_k$ is performed on a global parameter server 104, with the update of primal $W^k$ and the dual $\Lambda^k$ being performed on each local device 102. The update of the local parameters at a time t+1 is based on a previous iteration at time t:

$$(W^k)^{t+1} = \underset{W^k}{\operatorname{argmin}} F(W^K) + \frac{\rho}{2} \| W^k - (W^{G_k})^t + (\Lambda^k)^t \|^2$$

where ρ is a user-specified tuning parameter in ADMM and η is a user-tuned learning rate.

The update of the global parameters is as follows:

$$(W^{G_k})^{t+1} = \underset{W^k}{\operatorname{argmin}} \sum_k \frac{\rho}{2} \| (W^k)^{t+1} - W^{G_k} + (\Lambda^k)^t \|^2$$

The update of the local dual is as follows:

$$(\Lambda^k)^{t+1} = (\Lambda^k)^t + (W^k)^{t+1} - (W^{G_k})^{t+1}$$

In a dynamic sampling embodiment, the local parameters are updated as:

$$(W^k)^{t_s+1} = \underset{W^k}{\operatorname{argmin}} \eta \langle \nabla F((W^k)^{t_s}), W^k \rangle + \frac{1}{2} \| W^k - (W^k)^t \|^2 + \frac{\rho}{2} \| W^k - (W^{G_k})^t + (\Lambda^k)^t \|^2$$

This may alternately be expressed as:

$$(W^k)^{t_s+1} = \frac{1}{\rho+1} [(W^k)^{t_s} - \eta \nabla F(W^k)^{t_s}] + \frac{1}{\rho+1} [(W^{G_k})^t + (\Lambda^k)^t]$$

where $t_s$ is a number of iterations of updates performed on local machine s, which may be different from t, the number of iterations performed on the global model, due to distributed asynchronous updates. In other embodiments, $t_s$ may be equal to t for synchronous training, or approximately equal to t for approximate synchrony. In dynamic sampling the global model update and the dual update are performed in the same fashion as with fixed sampling.

The final global model update has the following form and can be performed asynchronously:

$$(W^{G_k})^{t+1} \frac{1}{k} \sum_k (W^t)^{t+1}$$

Because there is no replicated global model and each local machine gets its own local model and data, the present embodiments can be used to train very large deep networks. In deep CNNs, it is up to the user to choose whether kernels are sampled or not. If the input image size and the selected number of kernels is not too large, the convolution layers can be processed by a GPU without sampling.

Figure 4:
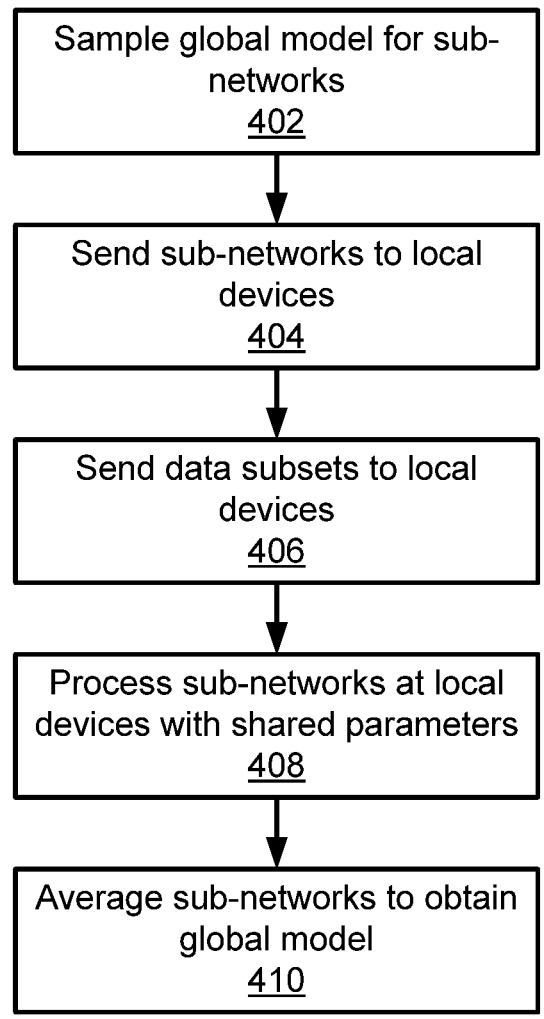
FIG. 4 is a block/flow diagram of a method of training a distributed neural network in accordance with the present embodiments.

Referring now to FIG. 4, a method of performing distributed deep learning is shown. Block 402 samples a global model to produce a set of sub-networks, each sub-network having a portion of the neurons at each layer of the global model. The sampling may be fixed, where the sub-network assignments do not change, or dynamic. Sampling may be performed based on a random selection of neurons and, for CNNs, convolutional kernels. It should be noted that sub-networks can overlap and may share parameters with other sub-networks. For dynamic sampling, block 402 periodically re-samples the global model.

Block 404 sends sub-networks to the local sub-network processing devices 102 and block 406 sends the data subsets to the local sub-networking processing devices 102. The data may be split according to any practical or design consideration, for example according to data gathering or storage constraints or by random process. Block 408 processes the sub-networks locally at the local sub-network processing devices 102, with each device 102 performing updates of the local parameters $W^k$ and the dual $\Lambda^k$ with communication between devices 102 in the event that their respective sub-networks share parameters. Each local sub-network processing device 102 maintains a copy of the model and shares its parameters after a fixed number of iterations. Parameters may alternatively by synchronized using interconnects such as remote direct memory access, in which each device 102 periodically updates to other devices 102 using pre-sender model receive queues. The devices 102 then retrieve the models locally when they finish local processing.

After the local models have been updated, block 410 averages the sub-networks to obtain a global model with parameters $W^{G_k}$. Once the global model has been trained, it may be applied in a distributed form if it cannot be stored on a single machine using, e.g., distributed matrix multiplication.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
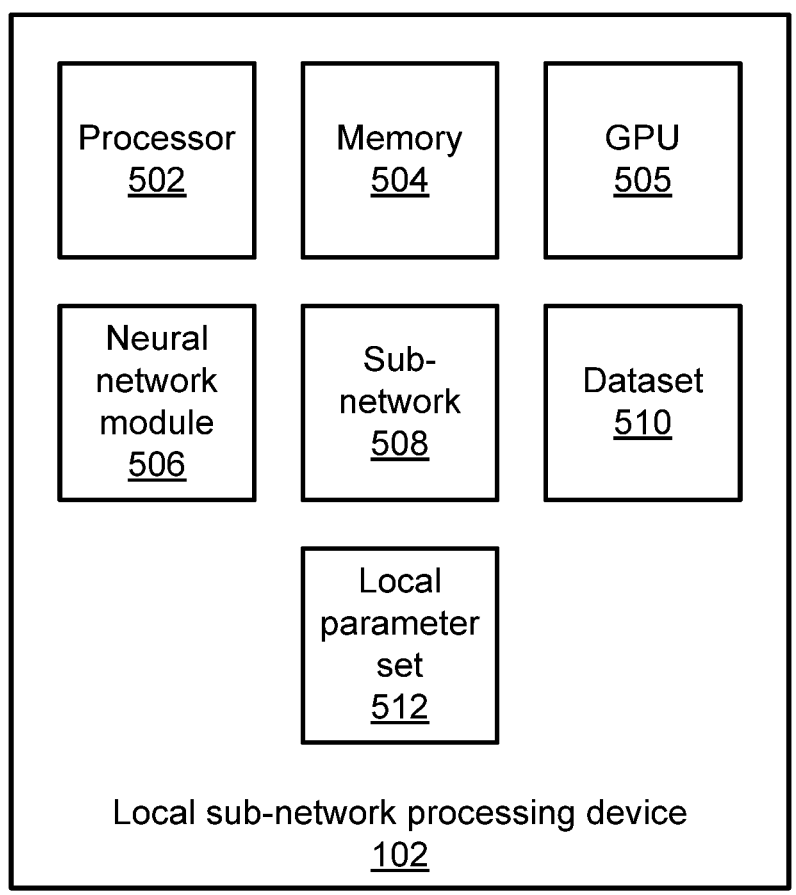
FIG. 5 is a block diagram of a neural sub-network processing device in accordance with the present embodiments.

Referring now to FIG. 5, additional detail on the local sub-network processing devices 102 is shown. The local devices 102 include a hardware processor (e.g., a CPU) 502 and memory 504. The local devices may also include a GPU 505, which is dedicated hardware configured to perform complex processing tasks. The local devices 102 may further include one or more functional modules. In some embodiments, the functional modules may be implemented as software that is stored in memory 504 and executed by hardware processor 502. In other embodiments, the functional modules may be implemented as one or more discrete hardware components in the form of, e.g., an application specific integrated chip or a field programmable gate array.

In particular, the local devices 102 include a neural network module 506. The neural network module 506 implements a set of neurons in accordance with a sub-network 508 that represents a subset of the global neural network being processed. The neural network module 506 may furthermore be implemented using a hardware neural network structure formed from, e.g., a set of hardware weights. The neural network module 506 is trained using dataset 510 and updates the local parameter set 512. This local parameter set 512 is subsequently combined with that of other local devices 102 to form a global parameter set that represents the trained global neural network.

Figure 6:
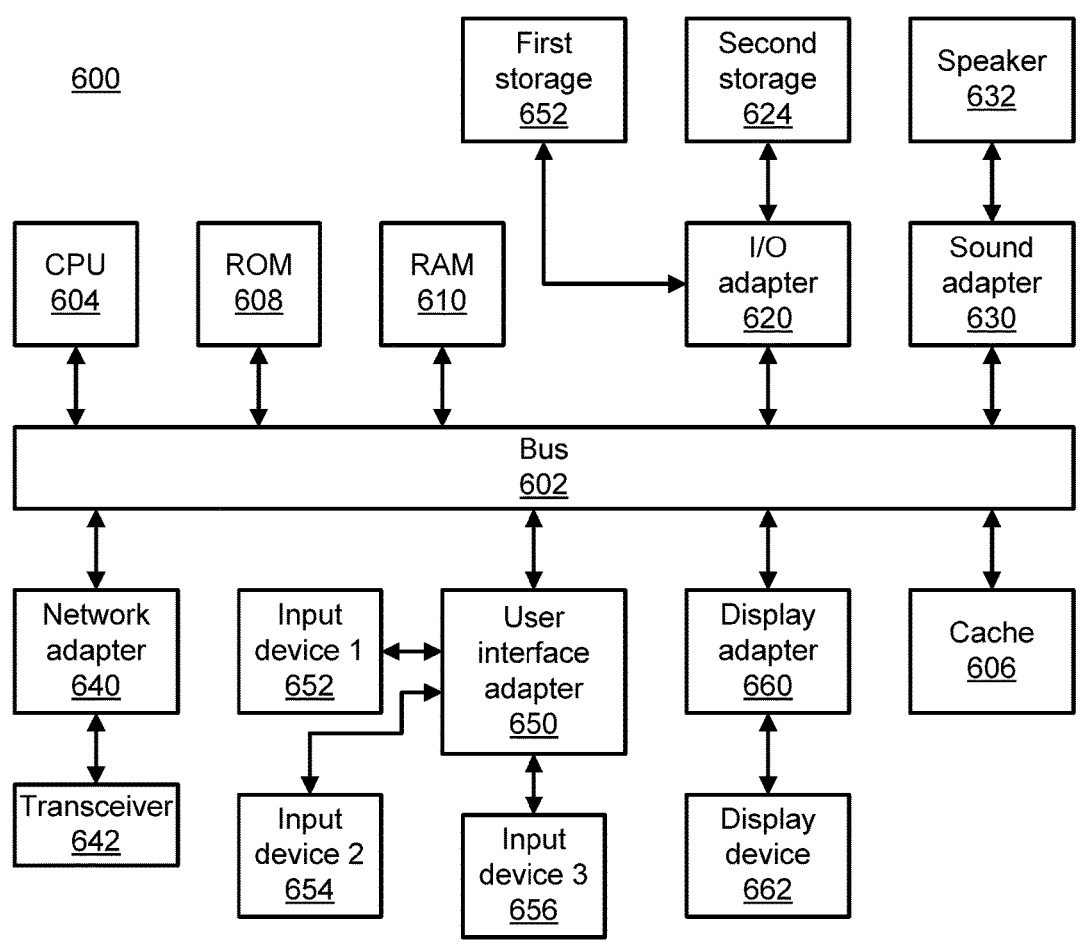
FIG. 6 is a block diagram of a processing system in accordance with the present principles.

Referring now to FIG. 6, an exemplary processing system 600 is shown which may represent the local sub-network processing devices 102 and the global parameter server(s) 104. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for training a neural network, comprising:
   sampling a plurality of local sub-networks from a global neural network, wherein the local sub-networks comprise a subset of neurons from each layer of the global neural network;
   training the plurality of local sub-networks at respective local processing devices to produce trained local parameters; and
   averaging the trained local parameters from each local sub-network to produce trained global parameters.

2. The method of claim 1, wherein sampling the plurality of local sub-networks comprises fixed sampling.

3. The method of claim 1, wherein sampling the plurality of local sub-networks comprises dynamic sampling.

4. The method of claim 1, wherein training the plurality of local sub-networks comprises sharing local parameters between local processing devices when parameters overlap in respective sub-networks.

5. The method of claim 1, wherein the global parameters are stored at a single global parameter server.

6. The method of claim 1, further comprising performing a classification task using the trained global parameters.

7. The method of claim 6, wherein performing the classification task comprises performing distributed matrix multiplication.

8. A system for training a neural network, comprising:
a plurality of local sub-network processing devices, each comprising:
a neural network module comprising neurons that represent a subset of neurons from each layer of a global neural network, the neural network module being configured to train a local sub-network to produce trained local parameters; and
a global parameter server configured to average the trained local parameters from each local sub-network to produce trained global parameters.

9. The system of claim 8, wherein the neurons of each neural network module represent a local sub-network that is sampled from the global neural network based on fixed sampling.

10. The system of claim 8, wherein the neurons of each neural network module represent a local sub-network that is sampled from the global neural network based on dynamic sampling.

11. The system of claim 8, wherein the neural network module of each local sub-network processing device is further configured to share local parameters between local processing devices when parameters overlap in respective sub-networks.

12. The system of claim 8, wherein the plurality of local sub-network processing devices are further configured to perform a classification task using the trained global parameters.

13. The system of claim 12, wherein the plurality of local sub-network processing devices are further configured to perform distributed matrix multiplication.

* * * * *